US00RE45977E

(19) United States
(12) Reissued Patent
Goering

(10) Patent Number: US RE45,977 E
(45) Date of Reissued Patent: Apr. 19, 2016

(54) HYBRID THREE-DIMENSIONAL WOVEN/LAMINATED STRUTS FOR COMPOSITE STRUCTURAL APPLICATIONS

(75) Inventor: Jonathan Goering, York, ME (US)

(73) Assignee: Albany Engineered Composites, Inc., Rochester, NH (US)

(21) Appl. No.: 13/385,113

(22) Filed: Feb. 2, 2012

Related U.S. Patent Documents

Reissue of:
(64) Patent No.: 7,655,581
Issued: Feb. 2, 2010
Appl. No.: 11/281,063
Filed: Nov. 17, 2005

(51) Int. Cl.

| | |
|---|---|
| ***D03D 1/00*** | (2006.01) |
| ***D03D 11/00*** | (2006.01) |
| ***D03D 25/00*** | (2006.01) |
| ***B32B 27/04*** | (2006.01) |
| ***D03D 13/00*** | (2006.01) |
| ***B29B 11/16*** | (2006.01) |
| ***A61K 51/12*** | (2006.01) |
| ***B29C 70/24*** | (2006.01) |
| ***D03D 11/02*** | (2006.01) |

(Continued)

(52) U.S. Cl.
CPC ..... *B29B 11/16* (2013.01); *A61K 51/1282* (2013.01); *B29C 70/222* (2013.01); *B29C 70/24* (2013.01); *D03D 11/00* (2013.01); *D03D 11/02* (2013.01); *D03D 25/005* (2013.01); *A61N 5/1002* (2013.01); *A61N 2005/1019* (2013.01)

(58) Field of Classification Search
CPC ..... B29B 11/16; B29C 70/24; B29C 70/222; D03D 11/02; D03D 25/005; D03D 11/00
USPC ..... 442/205, 203, 251, 254, 239; 428/114, 428/156, 542.8; 139/1 R, 11, 384 R
See application file for complete search history.

(56) References Cited

U.S. PATENT DOCUMENTS

| | | | | |
|---|---|---|---|---|
| 4,379,798 | A | 4/1983 | Palmer et al. | 428/113 |
| 4,622,254 | A | 11/1986 | Nishimura et al. | 428/102 |
| 4,922,968 | A | 5/1990 | Bottger et al. | 139/384 R |

(Continued)

FOREIGN PATENT DOCUMENTS

| | | | |
|---|---|---|---|
| FR | 1239073 | A1 * | 9/2002 |
| GB | 2299379 | A | 10/1996 |

(Continued)

OTHER PUBLICATIONS

Crawford, R.J. (1998). Plastics Engineering (3rd Edition). (pp. 168-203). Elsevier. Online version available at: http://www.knovel.com/knovel2/Toc.jsp?BookID=439&VerticalID=0.*

(Continued)

*Primary Examiner* — Norca L Torres Velazquez
(74) *Attorney, Agent, or Firm* — Frommer Lawrence & Haug LLP

(57) ABSTRACT

A woven preform used to reinforce a composite structure which includes a central portion having a plurality of interwoven layers. The preform also includes first and second end portions having a plurality of independent woven layers that are integrally woven with the plurality of interwoven layers in the central portion and which extend along the entire length the preform. Interspersed between the plurality of independent woven layers in the first and second end portions are bias plies.

7 Claims, 8 Drawing Sheets

(51) Int. Cl.
*B29C 70/22* (2006.01)
*A61N 5/10* (2006.01)

(56) References Cited

U.S. PATENT DOCUMENTS

| | | | | |
|---|---|---|---|---|
| 5,085,252 | A * | 2/1992 | Mohamed et al. | 139/22 |
| 5,130,188 | A * | 7/1992 | Anahara et al. | 442/205 |
| 5,236,020 | A * | 8/1993 | Sakatani et al. | 139/384 R |
| 5,263,516 | A | 11/1993 | Van Schuylenburch | 139/411 |
| 5,279,892 | A | 1/1994 | Baldwin et al. | |
| 5,399,418 | A * | 3/1995 | Hartmanns et al. | 428/218 |
| 5,465,760 | A * | 11/1995 | Mohamed et al. | 139/11 |
| 5,508,096 | A * | 4/1996 | Van Skyhawk | 442/205 |
| 5,540,260 | A * | 7/1996 | Mood | 139/11 |
| 5,605,441 | A | 2/1997 | Boszor et al. | |
| 5,645,670 | A | 7/1997 | Reinfelder et al. | |
| 5,711,960 | A * | 1/1998 | Shikinami | 424/426 |
| 5,783,278 | A | 7/1998 | Nishimura et al. | |
| 5,791,879 | A | 8/1998 | Fitzgerald et al. | |
| 5,804,277 | A | 9/1998 | Ashbee | |
| 5,939,006 | A | 8/1999 | Wang et al. | |
| 6,283,168 | B1 | 9/2001 | Gu et al. | |
| 6,315,007 | B1 * | 11/2001 | Mohamed et al. | 139/11 |
| 6,431,837 | B1 | 8/2002 | Velicki | |
| 6,446,675 | B1 * | 9/2002 | Goering | 139/11 |
| 6,447,886 | B1 | 9/2002 | Mohamed et al. | 428/209 |
| 6,521,148 | B2 * | 2/2003 | Qiu et al. | 264/46.4 |
| 6,712,099 | B2 | 3/2004 | Schmidt et al. | 139/383 R |
| 6,742,547 | B2 | 6/2004 | Bryn et al. | 139/383 R |
| 6,849,150 | B1 | 2/2005 | Schmidt | |
| 6,874,543 | B2 * | 4/2005 | Schmidt et al. | 139/383 R |
| 6,892,766 | B2 * | 5/2005 | Bryn et al. | 139/11 |
| 7,077,167 | B2 * | 7/2006 | Nayfeh et al. | 139/11 |
| 7,101,154 | B2 | 9/2006 | Dambrine et al. | |
| 7,237,575 | B2 * | 7/2007 | Dini | 139/11 |
| 7,581,933 | B2 | 9/2009 | Bruce et al. | |
| 7,943,535 | B2 * | 5/2011 | Goering et al. | 442/205 |
| 2002/0056484 | A1 | 5/2002 | Uchida et al. | |
| 2002/0058991 | A1 * | 5/2002 | Schmitt | 623/1.15 |
| 2002/0069927 | A1 * | 6/2002 | Bryn et al. | 139/48 |
| 2002/0192450 | A1 * | 12/2002 | Schmidt et al. | 428/299.1 |
| 2003/0056847 | A1 * | 3/2003 | Schmidt et al. | 139/383 R |
| 2003/0078650 | A1 * | 4/2003 | Nunez et al. | 623/1.51 |
| 2003/0130728 | A1 * | 7/2003 | Nunez et al. | 623/1.31 |
| 2003/0196717 | A1 * | 10/2003 | Nunez et al. | 139/1 R |
| 2003/0217780 | A1 * | 11/2003 | Uchida | 139/11 |
| 2004/0062910 | A1 * | 4/2004 | Morrison | 428/137 |
| 2004/0168738 | A1 * | 9/2004 | Bryn et al. | 139/383 R |
| 2005/0146076 | A1 * | 7/2005 | Alexander et al. | 264/257 |
| 2005/0186081 | A1 * | 8/2005 | Mohamed | 416/226 |
| 2005/0274426 | A1 * | 12/2005 | Nayfeh et al. | 139/11 |
| 2008/0261474 | A1 * | 10/2008 | Goering | 442/195 |
| 2013/0259701 | A1 * | 10/2013 | Dambrine et al. | 416/229 R |

FOREIGN PATENT DOCUMENTS

| | | | |
|---|---|---|---|
| JP | 2-191743 | | 7/1990 |
| JP | 02191743 | A * | 7/1990 |
| JP | 9-157993 | | 6/1997 |
| JP | 09157993 | A * | 6/1997 |
| JP | 11-241256 | | 9/1999 |
| JP | 11241256 | A * | 9/1999 |

OTHER PUBLICATIONS

Krempel Grouip, (Oct. 22, 1994). Way Back Machine. http://web.archive.org/web/20041022214358/http://www.krempel.com/krempel_2002_gb/thermo_jsi2_gb.htm.*

Parmley, R.O. (2000). Illustrated Sourcebook of Mechanical Components. (pp. 20-34 to 20-35). McGraw-Hill. Online version available at: http://www.knovel.com/knovel2/Toc.jsp?BookID=323&VerticalID=0.*

Rohsenow, Warren M.; Hartnett, James P.; Cho, Young I. (1998). Handbook of Heat Transfer (3rd Edition). (pp. 16.33). McGraw-Hill. Online version available at: http://www.knovel.com/knovel2/Toc.jsp?BookID=1626&VerticalID=0.*

Peters, S.T. (1998). Handbook of Composites (2nd Edition). (pp. 34-47 & 434-444). Springer-Verlag. Online version available at: http://www.knovel.com/knovel2/Toc.jsp?BookID=359&VerticalID=0.*

* cited by examiner

HYBRID THREE-DIMENSIONAL WOVEN/LAMINATED STRUTS FOR COMPOSITE STRUCTURAL APPLICATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 7,655,581. The reissue application are application Ser. Nos. 13/385,114 (now U.S. Pat. No. Re. 45,777) and 13/385,113 (the present application).*

BACKGROUND OF THE INVENTION

1. Field of the Invention

The instant invention relates to the geometrical configuration of three-dimensional woven preforms for reinforced composite structures having quasi-isotropic or multi-directional reinforcement on one or two ends of the structure and approximately unidirectional reinforcement in all other areas.

2. Background of the Invention

The use of reinforced composite materials to produce structural components is now widespread, particularly in applications where their desirable characteristics for being lightweight, strong, tough, thermally resistant, self-supporting and adaptability to being formed and shaped are sought. Such components are used, for example, in the aeronautical, aerospace, satellite, and battery industries, as well as for recreational uses such as in racing boats and autos, and in countless other applications. A three-dimensional fabric generally consists of fibers oriented in three directions with each fiber extending along a direction perpendicular to the other fibers, that is along the X, Y and Z axial directions.

Typically, components formed from such fabrics consist of reinforcement materials embedded in matrix materials. The reinforcement component may be made from materials such as glass, carbon, ceramic, aramid (e.g., "KEVLAR®"), polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials such as very high strength, are imparted to the completed composite component. The constituent reinforcement materials may typically be woven, knitted or otherwise oriented into desired configurations and shapes for reinforcement preforms. Usually, particular attention is paid to ensure the optimum utilization of the properties for which these constituent reinforcing materials have been selected. Generally, such reinforcement preforms are combined with matrix material to form desired finished components or produce working stock for the ultimate production of finished components.

After a desired reinforcement preform has been constructed, matrix material may be introduced and combined with the preform, so that the reinforcement preform becomes encased in the matrix material such that the matrix material fills the interstitial areas between the constituent elements of the reinforcement preform. The matrix material may be any of a wide variety of materials, such as epoxy, polyester, vinylester, ceramic, carbon and/or other materials, which also exhibit desired physical, thermal, chemical and/or other properties. The materials chosen for use as the matrix may or may not be the same as that of the reinforcement preform and may or may not have comparable physical, chemical thermal or other properties. Typically, however, they will not be of the same materials or have comparable physical, chemical, thermal or other properties, as the reinforcement preform, since a usual objective sought in using composites in the first place is to achieve a combination of characteristics in the finished product that is not attainable through the use of one constituent material alone.

When combined, the reinforcement preform and the matrix material may then be cured and stabilized in the same operation by thermosetting or other known methods, and then subjected to other operations toward producing the desired component. It is significant to note that after being so cured, the then solidified masses of the matrix material are normally very strongly adhered to the reinforcing material (e.g., the reinforcement preform). As a result, stress on the finished component, particularly via its matrix material acting as an adhesive between fibers, may be effectively transferred to and borne by the constituent material of the reinforcing reinforcement preform.

Typically, simple, two-dimensional woven fabrics or unidirectional fibers are produced by a material supplier and sent to a customer who cuts out patterns and lays up the final part ply-by-ply. The simplest woven materials are flat, substantially two-dimensional structures with fibers in only two directions. They are formed by interlacing two sets of yarns perpendicular to each other. In two-dimensional weaving, the 0° yarns are called warp fibers or yarns and the 90° yarns are called the weft or fill fibers or yarns. For resin transfer molding, a series of woven fabrics can be combined to form a dry lay-up, which is placed in a mold and injected with resin. These fabrics can be pre-formed using either a "cut and sew" technique or thermally formed and "tacked" using a resin binder.

Two-dimensional woven structures, however, have limitations. The step of pre-forming requires extensive manual labor in the lay-up. Two-dimensional woven structures are not as strong or stretch-resistant along other than the 0° and 90° axes, particularly at angles farther from the fiber axes. One method to reduce this possible limitation is to add bias fibers to the weave, fibers woven to cut across the fabric at an intermediate angle, preferably at ±45° to the axis of the fill fibers.

Simple woven preforms are also single layered. This limits the possible strength of the material. One possible solution is to increase the fiber size. Another is to use multiple layers, or plies. An additional advantage of using multiple layers is that some layers may be oriented such that the warp and weft axes of different layers are in different directions, thereby acting like the previously discussed bias fibers. If these layers are a stack of single layers laminated together with the resin, however, then the problem of de-lamination arises. If the layers are sewn together, then many of the woven fibers may be damaged during the sewing process and the overall tensile strength may suffer. In addition, for both lamination and sewing of multiple plies, a hand lay-up operation usually is necessary to align the layers. Alternatively, the layers may be interwoven as part of the weaving process. Creating multiple interwoven layers of fabric, particularly with integral bias fibers, has been a difficult problem.

One example of where composite materials are used to produce structural components is in the production of struts and braces. Struts and braces typically comprise a central column having lugs on each end of the structure. These lugs can have either male or female (clevis) configurations and are used to attach the strut or brace to the structure it is reinforcing or bracing. As previously discussed, in order to achieve increased strength of the composite structure, multiple layers or plies are used for the lug and column portions of the struts and braces. Although using multiple layers is advantageous since individual layers can be oriented to provide reinforcement in the 0° and 90° directions as well as can be oriented on the bias to provide reinforcement in additional directions, such as the ±45° directions, if laminated together with resin, delamination of the layers may be problematic. Alternatively, if the layers are sewn together, then as previously discussed, many of the woven fibers may be damaged during the sewing process, reducing the overall tensile strength of the final structure.

Many examples of laminated lugs exist, some using hybrid materials (i.e. alternating carbon and titanium plies), but the laminated lugs have not been combined with a three-dimensional woven column. The viability of laminated composite lugs for very highly loaded structures has been demonstrated in several government funded programs. However, to the Applicant's knowledge, none of these programs considered the use of three-dimensional woven preforms.

Thus, three-dimensional preforms for use in struts and braces, having laminated lug ends or portions and a monolithic three-dimensional woven central column are desirable. The advantages of using a three-dimensional construction in the central portion of the preform are that it reduces the labor required to cut and collate all of the plies required for a thick composite, and it provides better damage tolerance than conventional laminated composites. The advantage of the independent layers in the ends is that the laminate can be tailored to have specific properties.

Accordingly, a need exists for a woven preform having an integrally woven three-dimensional central portion with laminated lug ends comprised of independent, woven layers.

SUMMARY OF THE INVENTION

It is therefore a principal object of the invention to provide a three-dimensional woven preform having an interwoven column portion and a stack of individually woven fabrics at the lug ends for use in a composite structure.

It is a further object of the invention to provide a woven preform for a thick composite structure that has quasi-isotropic or multi-directional reinforcement on one or two ends and nearly unidirectional reinforcement in all areas.

Yet another object of the invention is to provide a composite structure that can be used to carry large concentrated loads.

These and other objects and advantages are provided by the instant invention. In this regard, the instant invention is directed to a woven preform that is used to reinforce a composite structure and a method of manufacturing such a preform. The woven preform comprises a central portion with a plurality of layers woven together. The preform includes a first end portion having a plurality of independently woven layers that are integrally woven with the plurality of interwoven layers in the central portion and which extend along the entire length of the preform. The preform also includes a second end portion having a plurality of independently woven layers that are integrally woven with the plurality of interwoven layers in the central portion and which extend along the entire length of the preform. Interspersed between the plurality of independently woven layers in the first and second end portions are bias plies. In order to provide gaps between the independently woven layers in the first and second end portions for the bias plies, layers of warp fibers or yarns are woven out of the preform. In addition, a woven preform having a single lug end and a column portion end can be constructed according to any of the disclosed embodiments.

Another aspect of the instant invention is directed to a three-dimensional reinforced composite structure constructed using a woven preform disclosed herein. The reinforced composite structure comprises a central portion that has unidirectional reinforcement and first and second end portions that are quasi-isotropically or multi-directionally reinforced. The reinforced composite structure may also be constructed to have a column portion at one end and a lug portion at the other end.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated in the accompanying drawings in which corresponding components are identified by the same reference numerals.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PREFERRED EMBODIMENTS

Figure 1:
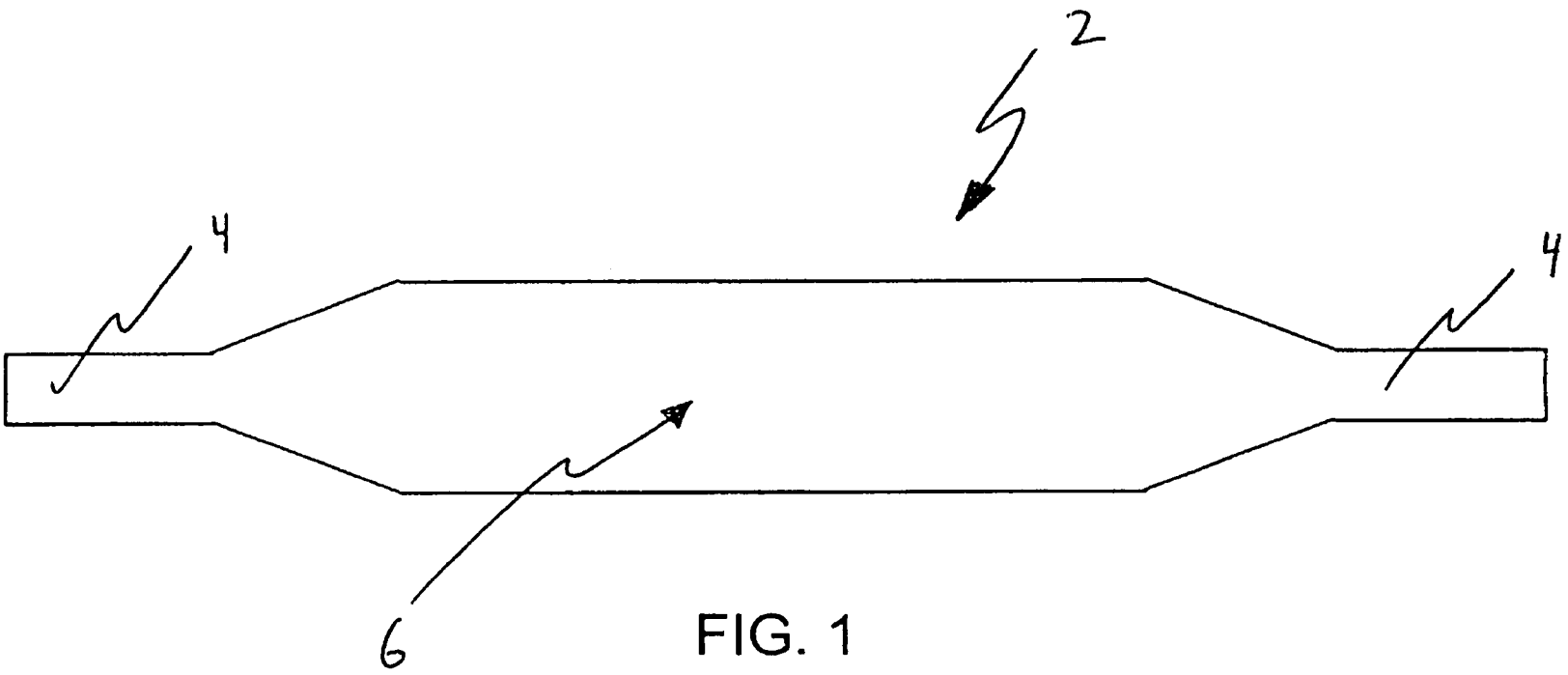
FIG. 1 is a plan view of a composite structure having a column portion with lug ends having a male configuration.

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

In the following description, like reference characters designate like or corresponding parts throughout the figures. Additionally, in the following description, it is understood that such terms as "upper," "lower," "top" and "bottom" and the like are words of convenience and are not to be construed as limiting terms.

Figure 2:
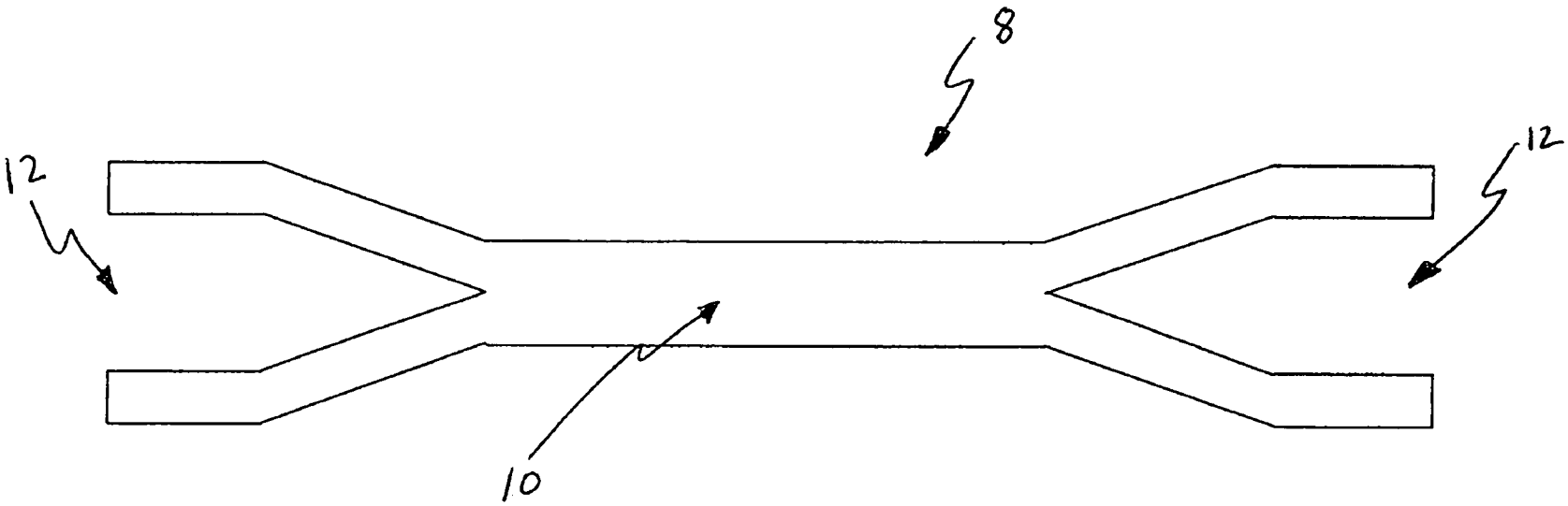
FIG. 2 is a plan view of a composite structure having a column portion with lug ends having a female or clevis configuration.

The instant invention is a preform concept for a composite structure or beam that has quasi-isotropic or multi-directional reinforcement on one or two ends and nearly unidirectional reinforcement in all other areas. This configuration is desirable for structures that have to carry large concentrated loads, such as struts and braces. The quasi-isotropic or multi-directionally reinforced ends provide good bearing properties and more balanced tension, compression, and shear strengths, making them good choices for the lug ends of the structure. These lug ends can have either male or female (clevis) configurations. The unidirectional portion provides high axial stiffness, which is good for preventing column buckling or crippling, making it a good choice for the main column of a strut or brace. Depicted in FIG. 1 is a strut or brace 2 having lug ends 4 and a three-dimensional main column portion 6. The lug ends 4 in FIG. 1 have a male configuration. FIG. 2 depicts a strut or brace 8 with a three-dimensional main column portion 10 and lug ends 12 having a female or clevis configuration.

The advantages of using a three-dimensional construction in the central portion of the preform are that it reduces the labor required to cut and collate all of the plies required for a thick composite and it provides better damage tolerance than conventional laminated composites. The advantage of the independent layers at the ends of the structure is that the laminate can be tailored to have specific properties. As disclosed, the lug ends are considered to be quasi-isotropic or multi-directionally reinforced, but they could be practically any laminate configuration.

The instant preform is comprised of a three-dimensional woven portion consisting of a number of layers and a similar number of independent bias layers. In the central or column portion of the three-dimensional woven piece, all of the layers are interwoven or integrally woven together forming a monolithic block of woven material. The fiber architecture used in this portion can be any conventional pattern for a thick preform, including, but not limited to, ply-to-ply, through thickness, angle interlock, or orthogonal architectures. At the ends of the structure, the individual layers weave independent of one another to form a stack of fabrics with reinforcement in the 0° and 90° directions, where 0° is along the length of the structure. The bias layers or plies, which are separately constructed provide reinforcement in additional directions to the 0°/90° direction such as in the ±45° direction, are interspersed between the layers of 0°/90° fabrics to form a more conventional laminate. The bias layers or plies can be woven using warp and weft fibers or yarns or they can be nonwoven, knitted or an array of MD or CD fibers or yarns. In the following figures, the warp direction is along the 0° direction or along the length of the structure and is indicated by arrow 100.

All of the layers that comprise the preform, including the central or column portion, are woven with warp fibers or yarns and weft or fill fibers or yarns using a Jacquard loom and captured shuttle, however, any conventional weaving technique may be used to weave the layers. The fibers or yarns can be either synthetic or natural materials such as, but not limited to carbon, nylon, rayon, polyester, fiberglass, cotton, glass, ceramic, aramid ("KEVLAR®") and polyethylene. The completed woven preform is then processed into a woven/laminated composite structure with the introduction of a matrix material such as, but not limited to, epoxy, polyester, vinyl-ester, ceramic, carbon and/or other materials, which also exhibit desired physical, thermal, chemical and/or other properties, using conventional techniques such as, but not limited to, resin transfer molding or chemical vapor infiltration.

Figure 3:
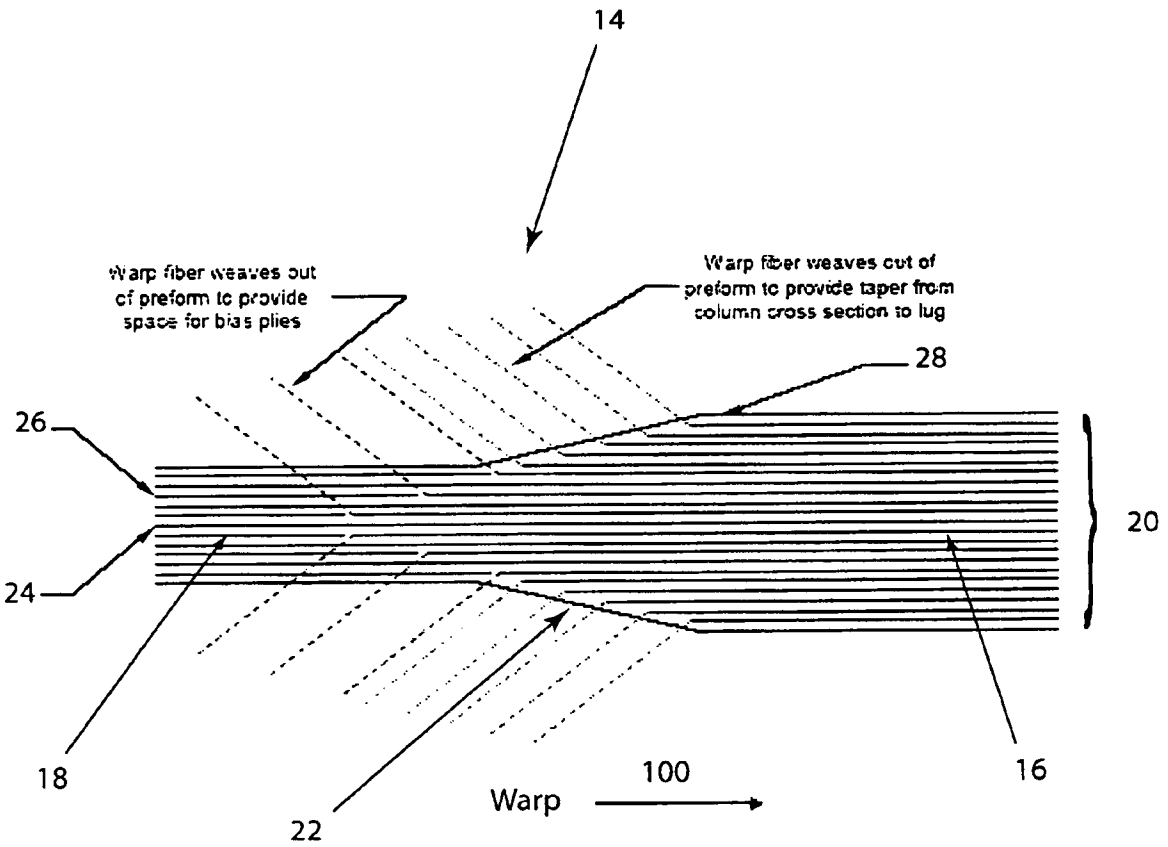
FIG. 3 is a plan view of a preform constructed according to one embodiment of the instant invention.

According to one embodiment of the instant invention, FIG. 3 depicts a segment of a structure 14 having a thick central portion 16 that is integral with two thinner male lug ends 18 that are positioned on each side of central portion 16. As can be seen FIG. 3, the thick central portion 16 is a monolithic, three-dimensional woven column comprised of a plurality of woven layers 20 that are interwoven or woven together. In order to form the thinner male lug ends 18, layers of warp fibers from the thick central column 16 are woven out of the preform to provide a tapered transition 22 from the column 16 to the thinner lug ends 18.

Once the desired number of warp fiber layers are woven out of the preform to taper the column down to the desired lug thickness, additional layers of warp fibers are woven out of the preform at the thinner lug ends 18 to provide a gap or space for the bias fabric plies. The remaining warp fibers at the thinner lug ends 18, which are integrally woven with the plurality of layers 20 in the column or central portion 16 and are continuous along the length of the structure, form individual layers of plies 24 that are woven independently of one another. This stack of plies or fabrics provide reinforcement at the thinner lug ends 18 in the 0° and 90° directions. Since the 0°/90° plies 24 are not interwoven with each other, bias plies 26 that provide reinforcement in additional directions, such as the ±45° direction, can be interspersed in the gaps between the 0°/90° plies 24, forming a stack of fabrics that, when a matrix material is applied, forms a laminated structure that provides quasi-isotropic or multi-directional reinforcement at the thinner lug ends 18. Furthermore, as depicted in FIG. 3, the structure has a continuous surface fiber 28 that is the result of the outermost warp fibers of the thick column 16.

If so desired, unlike the previously disclosed structure for this embodiment that has a central portion 16 with two thinner lug ends 18 on each side of the central portion 16, a structure having only one thinner lug end 18 may be constructed according to the disclosed embodiment. In such a case, the structure will comprise one end similar to the monolithic, three-dimensional woven central portion 16 and one thinner lug end 18 as disclosed above. A structure constructed in this manner, will more closely resemble FIG. 3.

Another embodiment of the instant invention is depicted in FIGS. 4A-4D, which show a segment of a structure 30 comprising two lug ends 32 that are thicker than the monolithic three-dimensional woven central column portion 34 of the structure 30. As is the case in the previous embodiment, the central column portion 34 is comprised of a plurality of woven layers 35 that are interwoven or woven together. In this configuration, however, there is no need to weave out warp fibers 36 from the column portion 34 in order to form the thicker lug ends 32. Instead, all of the warp fibers 36 used to construct the column portion 34 are used to construct the thicker lug ends 32. The warp fibers 36 from the column portion 24, however, are not interwoven with each other at the thicker lug ends 32. This allows the bias plies 38 to be interspersed between the warp fibers 40 in the thicker lug ends 32, which are the plies that provide reinforcement in the 0°/90° direction. Therefore, the thicker lug ends 32 have a stack of fabrics consisting of 0°/90° oriented plies or fabrics and separately constructed plies oriented in directions other than the 0°/90° direction, for example ±45° oriented plies or fabrics that, when a matrix material is applied, results in a laminated lug having quasi-isotropic or multi-directional reinforcement. Furthermore, as can be seen in FIGS. 4A-4D, structures constructed according to this embodiment will have a staggered transition 42 from the laminated thicker lug end 32 to the monolithic column portion 34, thereby improving load transfer from one portion to the other.

Figure 4A:
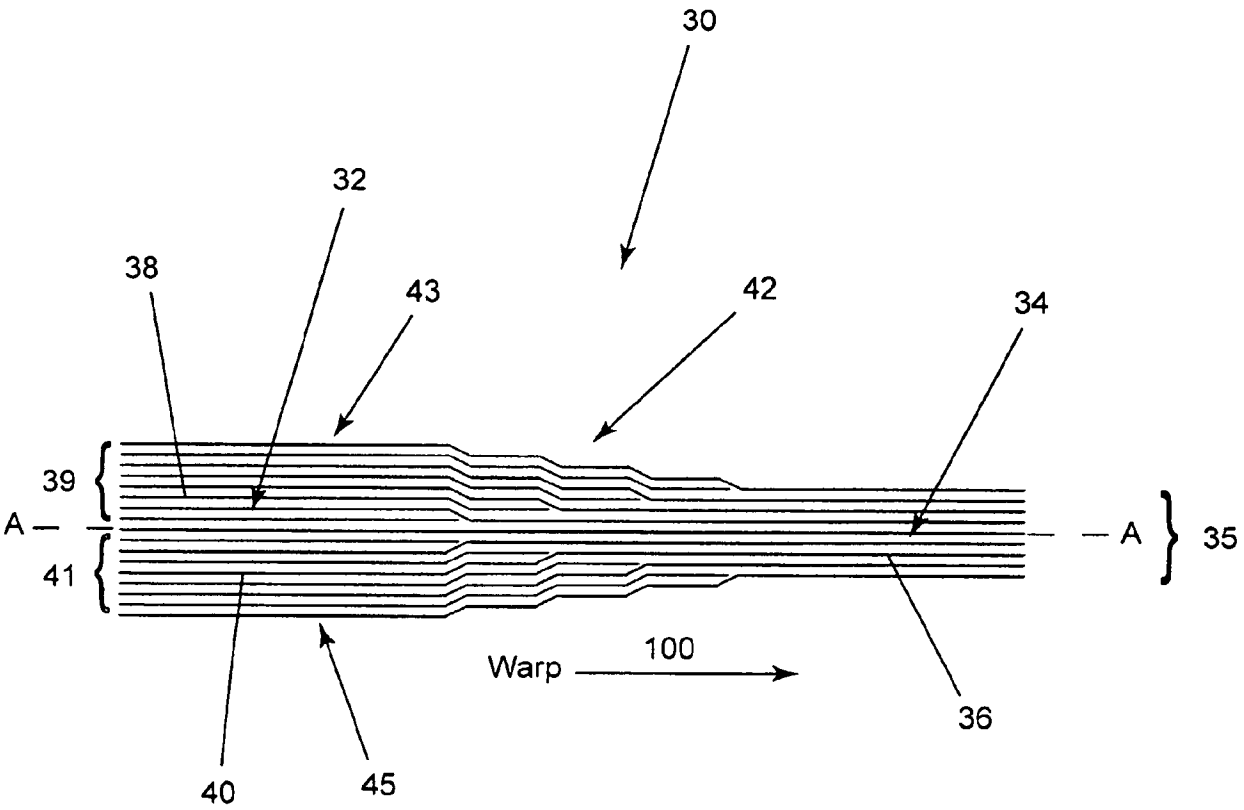
FIG. 4A is a plan view of a preform having lug ends with a symmetrical configuration constructed according to one embodiment of the instant invention.
Figure 4B:
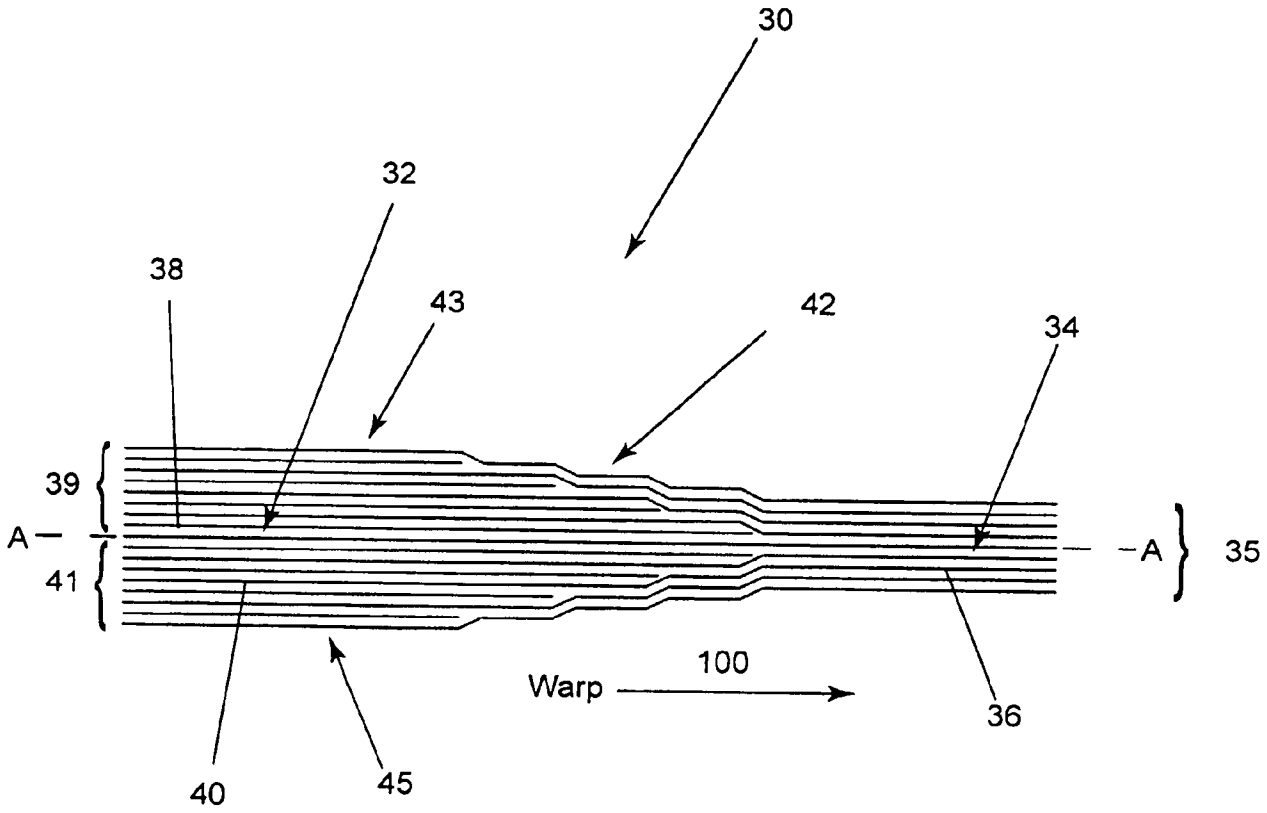
FIG. 4B is a plan view of a preform having lug ends with a symmetrical configuration constructed according to one embodiment of the instant invention.

As can be seen in FIGS. 4A-4D, the length and positioning of the bias plies 38 varies from figure to figure. FIGS. 4A and 4B depict a lug end 32 having a symmetrical configuration. That is, the length and positioning of the bias plies 38 in the lug end 32 are symmetric about the center line or longitudinal axis A-A. FIG. 4A depicts a symmetrical configuration where the length of successive bias plies 38 increases in the upper half 39 and the lower half 41 of the lug end 32 as one moves from the center line A-A toward the top surface 43 and the bottom surface 45 of the lug end 32. FIG. 4B depicts a symmetrical configuration where the length of successive bias plies 38 decreases in both halves, 39 and 41, of the lug end 32 as one moves from the center line A-A toward the top surface 43 and the bottom surface 45 of the lug end 32.

Figure 4C:
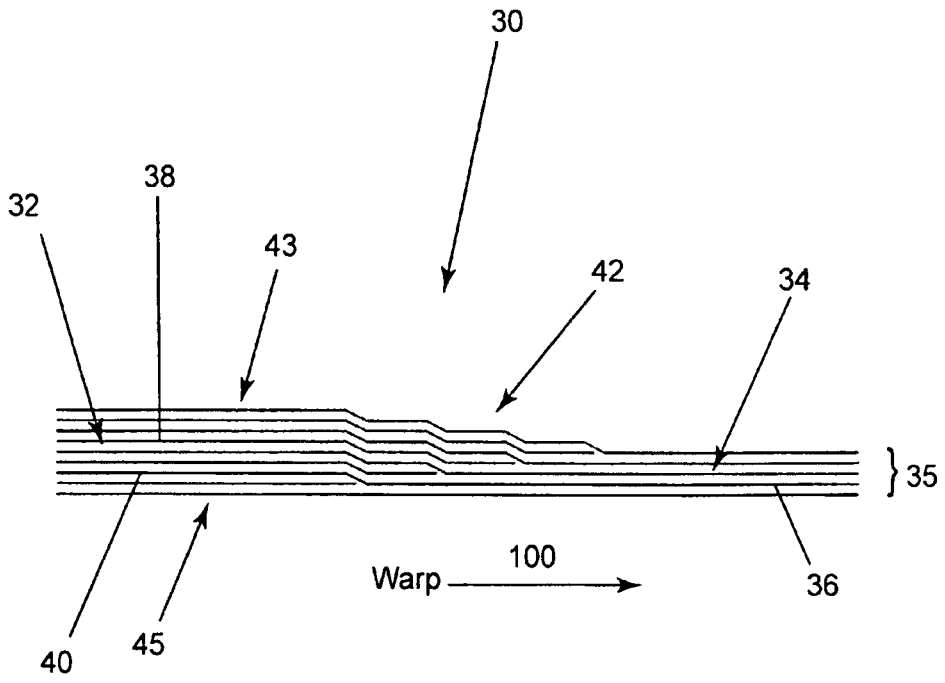
FIG. 4C is a plan view of a preform having lug ends with an asymmetrical configuration constructed according to one embodiment of the instant invention.
Figure 4D:
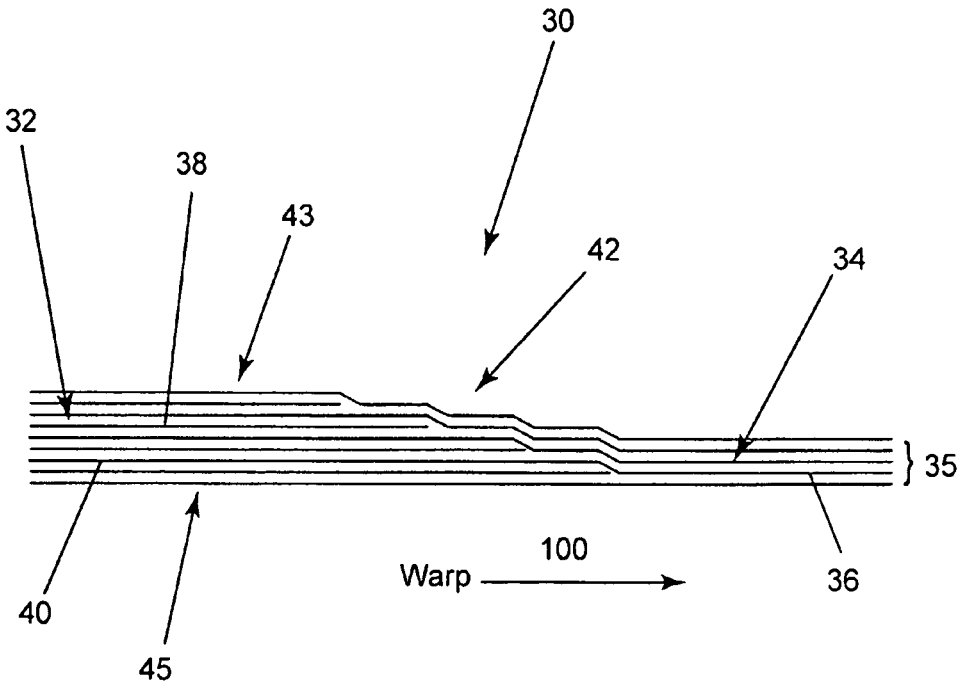
FIG. 4D is a plan view of a preform having lug ends with an asymmetrical configuration constructed according to one embodiment of the instant invention.

FIGS. 4C and 4D depict a lug end 32 having an asymmetrical configuration. That is, the length of the successive bias plies 38 in the lug end 32 only increases or decreases as one moves from the bottom surface 45 to the top surface 43 of the lug end 32. FIG. 4C shows an asymmetrical configuration where the length of successive bias plies 38 in the lug end 32 increases as one moves from the bottom surface 45 to the top surface 43 of the lug end 32. As shown in FIG. 4D, an asymmetrical lug end 32 can also be constructed where the length of successive bias plies 38 decreases as one moves from the bottom surface 45 to the top surface 43 of the lug end 32.

If so desired, unlike the previously disclosed structures for this embodiment that have a central portion 34 with two thicker lug ends 32 on each side of the central portion 34, a structure having only one thicker lug end 32 may be constructed according to the disclosed embodiment. In such a case, the structure will comprise one end similar to the monolithic, three-dimensional woven central portion 34 and one thicker lug end 32 as disclosed above. A structure constructed in this manner, will more closely resemble the structures depicted in FIGS. 4A-4D.

Figure 5:
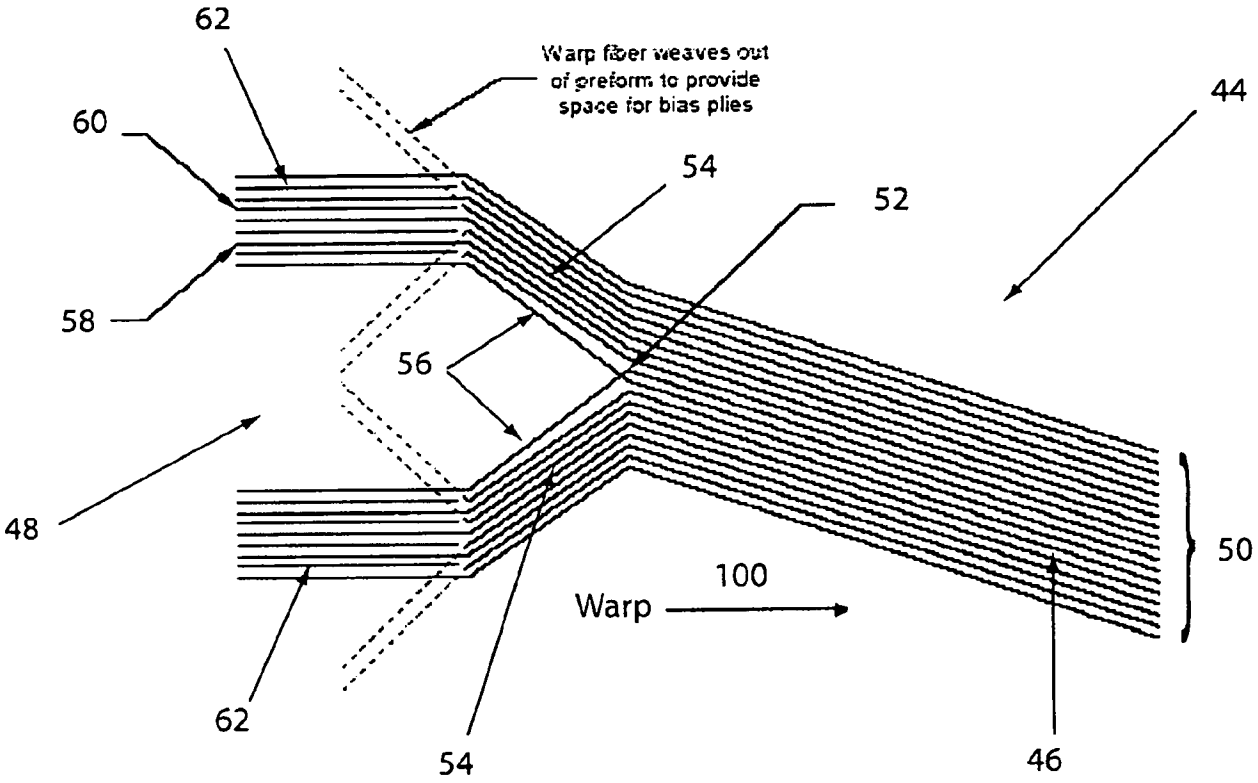
FIG. 5 is a plan view of a preform constructed according to one embodiment of the instant invention.

In another embodiment of the instant invention, FIG. 5 depicts a segment of a structure 44 having a monolithic three-dimensional woven central column portion 46 with two female lugs or devises 48. As can be seen in FIG. 5, the female lug ends 48 are angled relative to the central column portion 46, such that the female lug ends 48 are not in line or collinear with central column portion 46. Similarly to the previous embodiments, the central column portion 46 is comprised of a plurality of woven layers 50 that are interwoven or woven together. In order to form the female lug ends or devises 48, the monolithic column portion 46 is woven such that it bifurcates 52 to form both halves of the devises. The 0°/90° layers 54 in the first or angled portion 56 of each half of the devises continue to be interwoven together.

In order to provide a gap between the 0°/90° reinforcing layers 58 for the bias fabric plies 60 in the parallel or end portions 62 of the clevis, warp fibers are woven out of the angled portions 56 of the preform. The remaining warp fibers at the lug ends 48, which are integrally woven with the plurality of woven layers 50 in the central column portion 46 and angled portions 54, form individual layers that are woven independently of one another and provide reinforcement at the clevis 48 in the 0° and 90° directions. Since the 0°/90° layers 58 are not interwoven with each other, reinforcement in directions other than the 0°/90° direction, for example the ±45° direction is provided by the bias plies 60 that are interspersed between the 0°/90° plies 58, forming stacks of fabric at the devises that provide quasi-isotropic or multi-directional reinforcement when a matrix material is added to the preform.

If so desired, unlike the previously disclosed structure for this embodiment that has a central portion 46 with two female lug ends or devises 48 on each side of the central portion 46, a structure having only one female lug end 48 may be constructed according to the disclosed embodiment. In such a case, the structure will comprise one end similar to the monolithic, three-dimensional woven central portion 46 and one female lug end or clevis 48 as disclosed above. A structure constructed in this manner, will more closely resemble the structure depicted in FIG. 5.

In all of the disclosed embodiments, after the bias plies are inserted at the lug ends, the woven preform can be overbraided with a ply of glass material in order to improve the preform's abrasion resistance.

As is apparent to those skilled in the art, the structures disclosed above can have many forms in addition to those disclosed herein. For example, the structures can have a thick monolithic three-dimensional woven column with female or clevis lug configurations. The structure can also have a thick monolithic three-dimensional woven column with a male lug on one end and a female lug at the other end. In addition, the structure can have a thin monolithic three-dimensional woven column with female lugs at each end or a male lug at one end and a female lug at the other end. Lastly, all configurations can have: both lugs in line with or collinear with the main column portion; both lugs angled relative to the main column portion; or one lug can be collinear with the main portion and one lug can be angled relative to the main portion. Although as disclosed above, the lug ends are considered to be quasi-isotropic or multi-directionally reinforced, the lug ends can be practically any laminate configuration. Therefore, the instant structures, for example a strut or brace, can be designed to have different configurations in order to provide various types of reinforcing or bracing based on a structure's specific need or desired use.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

[1. A woven preform used to reinforce a composite structure comprising:

a central portion having a plurality of interwoven layers;

a first end portion having a plurality of independent woven layers;

a second end portion having said plurality of independent woven layers;

wherein plies of said plurality of independent woven layers extend through the entire length of said preform wherein said plies are integrally woven in said central portion to form a three dimensional fabric construction; and wherein said plies are independently woven in said end portions to form a stack of woven fabric;

wherein bias plies are interspersed between said plurality of independent woven layers plies in said first and second end portions.]

[2. The woven preform as claimed in claim 1, wherein said central portion comprises a plurality of layers that extend long the entire length of said woven preform and a plurality of layers that partially extend along the length of said woven preform.]

[3. The woven preform as claimed in claim 2, wherein said partially extending layers are formed by warp fibers or yarns that weave out of said woven preform and provide a transition from said central portion to said first and second end portions.]

[4. The woven preform as claimed in claim 2, wherein gaps for said bias plies between said independent woven layers in said first and second end portions are a result of warp fibers or yarns that weave out of said woven preform.]

[5. The woven preform as claimed in claim 1, wherein said first end portion is a lug having a male or a female configuration.]

[6. The woven preform as claimed in claim 1, wherein said second end portion is a lug having a male or a female configuration.]

[7. The woven preform as claimed in claim 1, wherein said first end portion is collinear with or angled relative to said central portion.]

[8. The woven preform as claimed in claim 1, wherein said second end portion is collinear with or angled relative to said central portion.]

[9. The woven preform as claimed in claim 3, wherein said transition between said column portion and said first and second end portions is a smooth tapered transition or a staggered transition.]

[10. The woven preform as claimed in claim 1, wherein said central portion is bifurcated at an end of said central portion.]

[11. The woven preform as claimed in claim 10, wherein said bifurcated end forms two halves of a female lug or clevis.]

[12. The woven preform as claimed in claim 1, wherein said central portion is thicker than said first and second end portions.]

[13. The woven preform as claimed in claim 1, wherein said central portion is thinner than said first and second end portions.]

[14. The woven preform as claimed in claim 1, wherein said first end portion and said second end portion are woven with warp and weft fibers or yarns.]

[15. The woven preform as claimed in claim 1, wherein said layers in said central portion are woven layers woven with warp and weft fibers or yarns.]

[16. The woven preform as claimed in claim 1, wherein said central portion has a fiber architecture selected from the group consisting of ply-to-ply, through thickness, orthogonal, and angle interlock.]

[17. The woven preform as claimed in claim 14 or 15, wherein said warp and weft fibers or yarns are selected from the group of synthetic or natural materials consisting of carbon, nylon, rayon, polyester, fiberglass, cotton, glass, ceramic, aramid, and polyethylene.]

[18. The woven preform as claimed in claim 1, wherein said woven preform is overbraided with a ply of glass.]

[19. A method of manufacturing a woven preform used to reinforce a composite structure comprising the steps of:

weaving a plurality of layers together to form a monolithic central portion;

weaving a plurality of independent layers to form a first end portion;

weaving said plurality of independent layers to form a second end portion, wherein plies of said plurality of independent woven layers extends through the entire length of said preform, wherein said plies are integrally woven in said central portion to form a three dimensional fabric construction, and wherein said plies are independently woven in said end portions to form a stack of woven fabric; and interspersing bias plies between said plurality of independent woven plies in said first and said second end portions.]

[20. The method as claimed in claim 19 further comprising the step of weaving warp fibers or yarns out of said woven preform in order to provide a transition from said central portion to said first and second end portions.]

[21. The method as claimed in claim 19 further comprising the step of weaving warp fibers or yarns out of said woven preform to form independent woven layers in said first and second end portions thereby providing a gap between said independent woven layers for said bias plies.]

[22. The method as claimed in claim 19, wherein said first end portion is a lug having a male or a female configuration.]

[23. The method as claimed in claim 19, wherein said second end portion is a lug having a male or a female configuration.]

[24. The method as claimed in claim 19, wherein said first end portion is collinear with or angled relative to said central portion.]

[25. The method as claimed in claim 19, wherein said second end portion is collinear with or angled relative to said central portion.]

[26. The method as claimed in claim 20, wherein said transition between said column portion and said first and second end portions is a smooth tapered transition or a staggered transition.]

[27. The method as claimed in claim 19, wherein said central portion is woven to have bifurcation at an end of said central portion.]

[28. The method as claimed in claim 27 wherein said bifurcated end forms two halves of a female lug or clevis.]

[29. The method as claimed in claim 19, wherein said central portion is thicker than said first and second end portions.]

[30. The method as claimed in claim 19, wherein said central portion is thinner than said first and second end portions.]

[31. The method as claimed in claim 19, wherein said central portion, said first end portion and said second end portion are woven with warp and weft fibers or yarns.]

[32. The method as claimed in claim 19, wherein said central portion is woven with a fiber architecture selected from the group consisting of ply-to-ply, through thickness, orthogonal, and angle interlock.]

[33. The method as claimed in claim 19, wherein said warp and weft fibers or yarns are selected from the group of synthetic or natural materials consisting of carbon, nylon, rayon, polyester, fiberglass, cotton, glass, ceramic, aramid, and polyethylene.]

[34. The method as claimed in claim 19, wherein said woven preform is overbraided with a ply of glass.]

[35. A three-dimensional composite structure reinforced with a woven preform comprising:

a central portion having a plurality of interwoven layers;

a first end portion having a plurality of independent woven layers;

a second end portion having said plurality of independent woven layers;

wherein plies of said plurality of independent woven layers extend through the entire length of said preform wherein said plies are integrally woven in said central portion to form a three dimensional fabric construction; and wherein said plies are independently woven in said end portions to form a stack of woven fabric;

wherein bias plies are interspersed between said plurality of independent woven layers plies in said first and second end portions; and a matrix material.]

[36. The composite structure as claimed in claim 35, wherein said central portion comprises a plurality of layers that extend along the entire length of said woven preform and a plurality of layers that partially extend along the length of said woven preform.]

[37. The composite structure as claimed in claim 36, wherein said partially extending layers are formed by warp fibers or yarns that weave out of said woven preform and provide a transition from said central portion to said first and second end portions.]

[38. The composite structure as claimed in claim 36, wherein gaps for said bias plies between said independent woven layers in said first and second end portions are a result of warp fibers or yarns that weave out of said woven preform.]

[39. The composite structure as claimed in claim 35, wherein said first end portion is a lug having a male or a female configuration.]

[40. The composite structure as claimed in claim 35, wherein said second end portion is a lug having a male or a female configuration.]

[41. The composite structure as claimed in claim 35, wherein said first end portion is collinear with or angled relative to said central portion.]

[42. The composite structure as claimed in claim 35, wherein said second end portion is collinear with or angled relative to said central portion.]

[43. The composite structure as claimed in claim 37, wherein said transition between said column portion and said first and second end portions is a smooth tapered transition or a staggered transition.]

[44. The composite structure as claimed in claim 35, wherein said central portion is bifurcated at an end of said central portion.]

[45. The composite structure as claimed in claim 44, wherein said bifurcated end forms two halves of a female lug or clevis.]

[46. The composite structure as claimed in claim 35, wherein said central portion is thicker than said first and second end portions. ]

[47. The composite structure as claimed in claim 35, wherein said central portion is thinner than said first and second end portions.]

[48. The composite structure as claimed in claim 35, wherein said first and said second end portions are quasi-isotropically or multi-directionally reinforced.]

[49. The composite structure as claimed in claim 35, wherein said first end portion and said second end portion are woven with warp and weft fibers or yarns.]

[50. The composite structure as claimed in claim 35, wherein said layers in said central portion are woven layers woven with warp and weft fibers or yarns.]

[51. The composite structure as claimed in claim 35, wherein said woven central portion has a fiber architecture selected from the group consisting of ply-to-ply, through thickness, orthogonal, and angle interlock.]

[52. The composite structure as claimed in claim 49 or 50, wherein said warp and weft fibers or yarns are selected from the group of synthetic or natural materials consisting of carbon, nylon, rayon, polyester, fiberglass, cotton, glass, ceramic, aramid, and polyethylene.]

[53. The composite structure as claimed in claim 36, wherein said composite structure is formed from a process selected from the group consisting of resin transfer molding and chemical vapor filtration.]

[54. The composite structure as claimed in claim 53, wherein said matrix material is selected from the group consisting of epoxy, polyester, vinyl-ester, ceramic, and carbon.]

[55. A woven preform used to reinforce a composite structure comprising:

a column portion having a plurality of interwoven layers; and a lug end portion having a plurality of independent woven layers, wherein plies of said plurality of independent woven layers extend through the entire length of said preform wherein said plies are integrally woven in said column portion to form a three dimensional fabric construction; and wherein said plies are independently woven in said end portion to form a stack of woven fabric;

wherein bias plies are interspersed between said plurality of independent woven layers plies in said lug end portion.]

[56. The woven preform as claimed in claim 55, wherein said lug end portion has a male or female configuration.]

[57. The woven preform as claimed in claim 55, wherein said lug end portion is collinear with or angled relative to said column portion.]

[58. The woven preform as claimed in claim 55, wherein said column portion is thicker than said lug end portion.]

[59. The woven preform as claimed in claim 55, wherein said column portion is thinner than said lug end portion.]

[60. The woven preform as claimed in claim 55, further comprising a matrix material.]

*61. A woven preform for use as reinforcement in a composite structure comprising:*

*a three-dimensional central portion having a plurality of warp fibers interwoven with a plurality of weft fibers in three dimensions (X, Y, and Z);*

*a first end portion; and*

*a second end portion;*

*wherein said woven preform comprises one or more warp fibers on an outer surface of said preform that extend continuously on the outer surface along the entire length of said woven preform; and*

*wherein said woven preform comprises one or more warp fibers that extend along the entire length of said woven preform and a plurality of warp fibers that weave out of said woven preform and provide a transition from said central portion to at least one of said first and second end portions.*

*62. A method of manufacturing a woven preform for use as reinforcement in a composite structure comprising the steps of:*

*weaving a plurality of warp fibers with a plurality of weft fibers in three dimensions (X, Y, and Z) to form a three-dimensional central portion;*

*weaving a plurality of the warp fibers with a plurality of weft fibers in three dimensions (X, Y, and Z) to form a three-dimensional first end portion;*

*weaving a plurality of the warp fibers with a plurality of weft fibers in three dimensions (X, Y, and Z) to form a three-dimensional second end portion;*

*wherein the woven preform comprises one or more warp fibers on an outer surface of said woven preform are woven to extend along the entire length of said woven preform; and*

*wherein said woven preform comprises one or more warp fibers that extend continuously on outer surface along the entire length of said woven preform and a plurality of*

*warp fibers that weave out of said woven preform and provide a transition from said central portion to at least one of said first and second end portions.*

*63. A woven preform for use as reinforcement in a composite structure comprising:*

*a three-dimensional central portion having a plurality of warp fibers interwoven with a plurality of weft fibers in three dimensions (X, Y, and Z); and*

*wherein said woven preform comprises one or more warp fibers on an outer surface of said woven preform that extend continuously on the outer surface along the entire length of said woven preform; and*

*wherein two or more warp fibers in adjacent layers exchange position through a thickness of the central portion at a bifurcation at an end of said central portion.*

*64. A method of manufacturing a woven preform for use as reinforcement in a composite structure comprising the step of:*

*weaving a plurality of warp fibers with a plurality of weft fibers in three dimensions (X, Y, and Z) to form a three-dimensional central portion of the woven preform such that one or more warp fibers extend continuously on an outer surface of the three-dimensional central portion of the preform and extend along the entire length of said woven preform;*

*wherein two or more warp fibers in adjacent layers of the central portion are woven to exchange position through a thickness of the central portion at a bifurcation at an end of said central portion.*

*65. A woven preform for use as reinforcement in a composite structure comprising:*

*at least one end portion; and*

*a three-dimensionally woven central portion comprising a plurality of warp fibers interwoven with a plurality of weft fibers in three dimensions (X, Y, and Z) comprising:*

*the plurality of weft fibers comprising first yarns extending in a weft direction;*

*the plurality of warp fibers comprising second yarns extending in a warp direction, wherein the first and second yarns form interwoven layers in the central portion;*

*wherein there is a greater number of second yarns in a first region of the woven central portion than in a second region of the woven central portion.*

*66. A method of forming a woven preform comprising a three-dimensionally woven central portion and at least one end portion for use as reinforcement in a composite structure comprising the steps of:*

*weaving first yarns extending in a weft direction and second yarns extending in a warp direction to form the three-dimensionally woven central portion at a first region of the preform;*

*weaving out select second yarns in three dimensions (X, Y, and Z) in a second region of the preform to reduce a thickness of the three-dimensionally woven central portion in the second region.*

*67. A woven preform for use as reinforcement in a composite structure comprising:*

*at least one end portion; and*

*a three-dimensionally woven central portion comprising a plurality of warp yarns interwoven with a plurality of weft yarns in three dimensions (X, Y, and Z),*

*wherein one or more warp yarns extend along the entire length of said preform, and one or more warp yarns extend less than the entire length of said preform.*

* * * * *